US006391489B1

(12) United States Patent
Winch et al.

(10) Patent No.: US 6,391,489 B1
(45) Date of Patent: May 21, 2002

(54) BATTERY TERMINAL JUMPER CLIP

(75) Inventors: Cary Winch, Necedah; Craig Edevold, Tomah, both of WI (US); Gregory Mears, Raleigh, NC (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/538,052

(22) Filed: Mar. 29, 2000

(51) Int. Cl.[7] .......................... H01M 2/20; H01M 2/30

(52) U.S. Cl. .......................... 429/121; 429/1; 439/500; 439/761

(58) Field of Search .......................... 429/121, 1, 100; 439/500, 761, 770

(56) References Cited

U.S. PATENT DOCUMENTS

| | | | | |
|---|---|---|---|---|
| 4,265,984 A | * | 5/1981 | Kaye | 429/178 |
| 4,291,106 A | * | 9/1981 | Hooke | 429/1 |
| 4,516,817 A | | 5/1985 | Deters | 339/19 |
| 5,833,492 A | | 11/1998 | Lueder | 439/500 |
| 5,965,292 A | * | 10/1999 | Kim et al. | 429/121 |

FOREIGN PATENT DOCUMENTS

| | | | |
|---|---|---|---|
| EP | 0623972 | 11/1994 | H01R/11/28 |
| FR | 2607949 | 6/1988 | G09B/19/00 |
| JP | 4174966 | 6/1992 | |

* cited by examiner

*Primary Examiner*—Carol Chaney
(74) *Attorney, Agent, or Firm*—Leydig, Voit & Mayer, Ltd.

(57) ABSTRACT

A battery terminal jumper clip is presented that is capable of providing series battery connection between adjacent batteries in a battery stack useful for an uninterruptible power supply. The battery terminal jumper clip accommodates tab type terminal connectors and utilizes a single piece unitary construction. Once inserted to provide series coupling between adjacent batteries, the battery terminal jumper clip prevents inadvertent removal by providing a snap-on locking surface for the tab terminal connectors. Lateral removal is also inhibited via axial retention surfaces on either side of the battery terminal jumper clip. A bus surface provides a current path between adjacent tab connectors in the series coupling, and mechanical connection is insured through the provision of at least tab retention clip. Relative vertical movement between adjacent batteries is accommodated by providing two tab retention clips, one for each tab terminal connector, and may be enhanced by providing multiple constituent retention clip segments for each tab terminal connector. A auxiliary connection terminal may be included to provide easy access for diagnostic equipment. This auxiliary connection terminal may be integrally formed in a top bus surface, or may alternatively be formed on an edge.

31 Claims, 14 Drawing Sheets

BATTERY TERMINAL JUMPER CLIP

FIELD OF THE INVENTION

The invention relates generally to electrical terminal connectors, and more specifically to terminal connectors adapted to provide multi-battery couplings for batteries that utilize tab type terminals.

BACKGROUND OF THE INVENTION

As more and more segments of the business environment enter the information age, more and more computers and computing power are required. As businesses move from the old to the new economy, their reliance on the processing, transference, and storage of digital information is becoming a more and more critical aspect of their overall business strategy. While in the past, computer crashes were seen as a mere nuisance, the loss of computing power and business data may well devastate a business's ability to survive in this new economy. As such, the need for reliable, uninterruptible electric power to maintain the operational status of the computing equipment and the integrity of the digital data continues to rise.

To meet these requirements, uninterruptible power supplies (UPS) have been developed that utilize a bank of electric storage batteries and solid-state conversion equipment to provide continuous electric power to a business's computer systems in the event of a loss of power from the utility. The number of batteries contained within an UPS is dependent upon the business's length of time that it needs to operate in the event of a utility power system failure. However, with many utilities requiring rolling brownouts during peak electric usage periods, the number of batteries being utilized continues to increase.

A typical UPS includes multiple banks of series connected batteries that supply DC electric power to a solid state power inverter. The inverter converts the direct current battery power to alternating current power for use by computing utilization equipment. As illustrated in FIG. 15, a typical battery configuration includes two tab type output connectors 200, 202 from which their DC power is supplied. The batteries 204*a–n* are placed side-by-side to form a battery bank for the UPS. The series coupling between each of the individual batteries in the bank is accomplished by providing a series coupling device 206. This device 206, as illustrated in greater detail in FIG. 16, consists of a simple assembly of two tab type connectors 208, 210 that are crimped to the ends of a jumper wire 212. While this simple apparatus 206 provides adequate series connections between each of the batteries in the battery bank, it suffers from a number of disadvantages.

Specifically, while the material costs of the apparatus 206 are fairly low, its construction and installation labor requirements are quite high. First, after the jumper wire 212 has been cut to the proper length, the insulation on each end must be removed to allow for proper electrical connection with the tab connectors 208, 210. The bare wire 214 must then be inserted into the crimping end 216 of the tab connector 208, 210 and crimped. The crimping must be controlled to supply the electrical connection to the wire 212, and to mechanically secure the bare wire 214 therein. This operation typically requires a special crimping tool to insure that the crimp is sufficient to meet industry standards for the pull requirement for this connection. Once this operation has been performed for each end of the jumper wire 212, the apparatus 206 must be installed to complete the series coupling of the batteries in the battery bank.

The installation of the apparatus 206 presents the second problem area for this configuration, that being the labor intensity required. Specifically, the tab connectors 208, 210 typically provide a friction or interference fit on the battery tab connectors 200, 202. As such, they can be fairly difficult to install, requiring that the assembly personnel grip one of the connectors 208 and force it onto one of the terminals 202. This process is often aided by a wiggling type motion of the connector 208 while pushing it on the battery's tab connector 202. While this wiggling type movement does not present a significant problem for the installation of the first of the two connectors of apparatus 206, a similar motion during the installation of the second such connector may fatigue the wire 214 at the junction with the crimping end 216 at one or both of these junctions. This results from the fact that one of the connectors is already fixed on a battery terminal while the other end is being manipulated in a wiggle fashion.

Further, once installed, these jumpers 206 present loops of wire that may be easily caught on the chassis, by monitoring equipment, maintenance personnel, etc. during installation, operation, or maintenance of the UPS. If such were to occur, once again the crimped couplings of the wire 214 to the connector crimp end 216 would be stressed. Eventually, such continued stressing and fatigue could lead to a failure of the jumper wire connection 206. Even if the jumper 206 did not actually break, it is possible that equipment catching the wire loop of this jumper 206 could dislodge one or both of the connections to the battery's tab terminals.

In addition to these problems, the installation of these jumpers 206 may also be uncomfortable for the assembly personnel who must literally install hundreds of such connections in a day. While the assembly personnel may wear gloves to protect his or her fingers from developing calluses, or may use an insertion tool such as a pair of needlenose or other type pliers, each of these personnel aids have their own drawbacks. Specifically, gloves may make it harder to grip the small connectors 208, 210, and may also reduce the assembler's ability to feel when the coupling is fully seated. This may result possibly in bending the tab connectors 200, 202 on the battery. Likewise, the use of pliers or other like tools to grip the connectors 208, 210 during the insertion onto connectors 200, 202 may result in damage to or even breakage of the connectors 200, 202. As may well be appreciated, once the connector 200, 202 is broken off of a battery, that battery cannot be used unless or until it can be repaired. Further, the use of pliers or other like tools may flatten or otherwise damage the connection surfaces on the connectors 208, 210. This would inhibit or diminish the connector's ability to maintain both electrical and mechanical contact on the battery's tab connectors 200, 202.

Therefore, there exists a need in the art to provide a simple, reliable, and cost effective apparatus to provide the series coupling between adjacent batteries in a UPS which overcomes these and other known problems existing in the art.

SUMMARY OF THE INVENTION

It is a feature of the battery terminal jumper clip of the invention to provide a single piece, unitary construction capable of electrically coupling adjacent batteries having tab type electrical terminals thereon. It is a further feature that the battery terminal jumper clip provides a snap-on, locking mechanism to inhibit the removal of the clip once installed on adjacent batteries in a battery bank. Further, it is a feature of the battery terminal jumper clip to provide a guided insertion surface to ease the installation of the clip on adjacent batteries during the battery bank manufacturing process. Additionally, the battery terminal jumper clip also includes axially retention surfaces to prevent the battery terminal jumper clip from working off the tab connectors from one side or another while still allowing limited axially movement of the connector due to shifting of the equipment or other causes of battery movement.

It is also a feature of the battery terminal jumper clips to provide a solid conductive bus for the conduction of current between adjacently mounted batteries in a battery bank. Preferably, the bus provided by the battery terminal jumper clip maintains a flat profile that is not prone to catching on other equipment, like the prior use of a loop of wire to provide this coupling. Additionally, it is a feature of the battery terminal jumper clips to provide a tab retention clips. These clips provide both electrical and mechanical coupling to the tab terminals of each of the two adjacent batteries to which the clip is attached. Preferably, an independently moveable retention clip is included for each of the two tab type terminals for the two adjacent batteries. Alternatively, it is a feature of the battery jumper clips to provide bifurcated tab retention clips to allow for greater movement of the individual batteries within the battery bank, while still maintaining electrical and mechanical contact therewith. It is also a feature of the battery terminal jumper clips to provide an integrated auxiliary connection terminal to allow external monitoring equipment to monitor the battery voltage at the coupling or to allow the supplying of power therefrom. This auxiliary connection terminal may preferably be integrated in to the top surface bus work, or may alternatively be provided as an integral portion of one of the axially retention surfaces.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
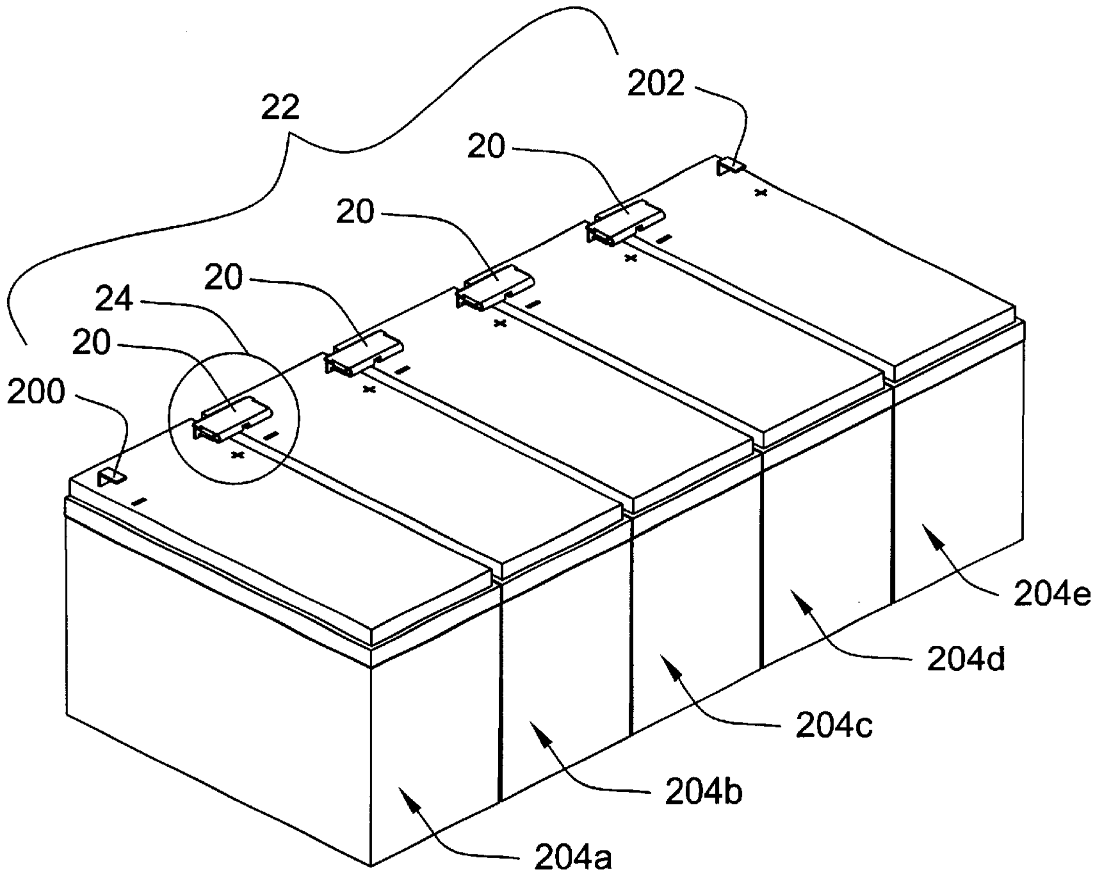
FIG. 1 is a front perspective illustration of a portion of a battery stack utilizing the battery terminal jumper clip of the invention.

An embodiment of the battery terminal jumper clip 20 of the invention, as illustrated in FIG. 1, provides series coupling between a plurality of batteries 204*a–e* forming a battery stack 22 suitable for use in an uninterruptible power supply (UPS). Such a configuration is typical for an uninterruptible power supply to which this invention is particularly well suited. However, it should be understood that the applicability to other components, products, and industries is not to be excluded by reference to a preferred implementation. While FIG. 1 illustrates a battery stack 22 including five batteries 204*a–e*, one skilled in the art will recognize that greater or fewer batteries may be included in the battery stack 22 depending on the system requirements of the UPS. Additional couplings may be added in like manner as will be described in greater detail below without deviating from the spirit and scope of the invention.

As may be seen and understood from this FIG. 1, each battery 204 includes a negative tab type terminal 200 and a positive tab type terminal 202. These tab connectors 200, 202 are positioned near the outer peripheral edges of the battery 204, one on either side as illustrated. To form the battery stack 22, a user merely places the batteries side by side on a rack or in a housing. The series connection between each of the adjacent batteries is then made by the battery terminal jumper clip 20 of the invention as illustrated in this FIG. 1. Specifically, the battery terminal jumper clip 20 makes electrical connection from the positive tab type terminal connector 202 of one battery to the negative tab type terminal connector 200 of the battery directly adjacent thereto to form the series connection. Once these series connections between the batteries have been made, the battery bank may be coupled in circuit with the UPS by providing connection to the tab connectors on the outside edges of the two end batteries (204A, 204E) in the battery stack 22. The UPS voltage requirements and the individual power output voltage level determines how many batteries are placed in series to form the complete battery stack 22.

Figure 2:
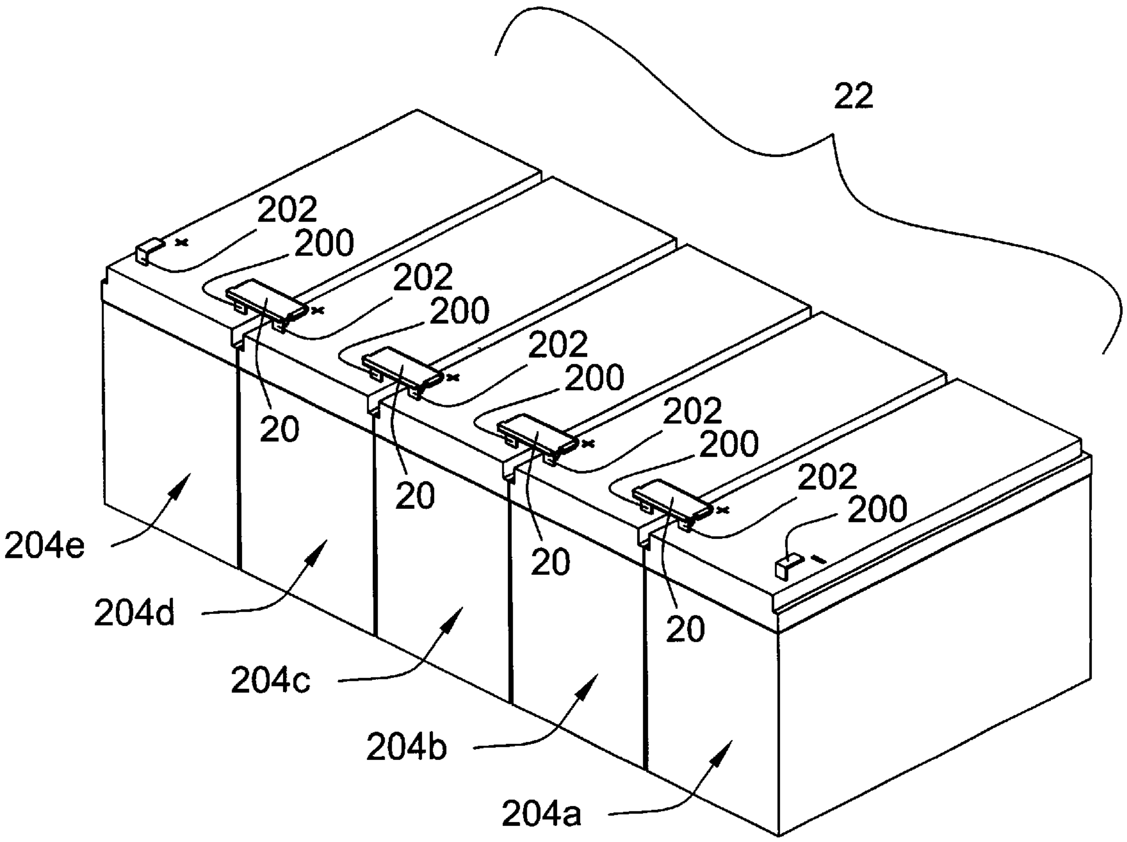
FIG. 2 is a rear perspective illustration of the battery stack of FIG. 1 illustrating additional aspects of the battery terminal jumper clip of the invention.

FIG. 2 provides a rear view illustration of the battery stack 22 illustrated in FIG. 1. This rear view illustration allows a clearer view of each of the tab type terminal connectors 200, 202 for each of the series connected batteries 204. The battery terminal jumper clip 20 provides this series connection in a very low profile manner as may be seen from this FIG. 2. Specifically, there are no wire loops or other structures that may protrude or otherwise extend vertically from the planar surface of the tab type terminals 200, 202 that could catch on other equipment such as the wire loops discussed in the background section above. Indeed, the battery terminal jumper clip 20 provides a unitary single piece construction whose reliability greatly exceeds the multi-piece assembly utilized to provide the series coupling in the past.

Figure 3:
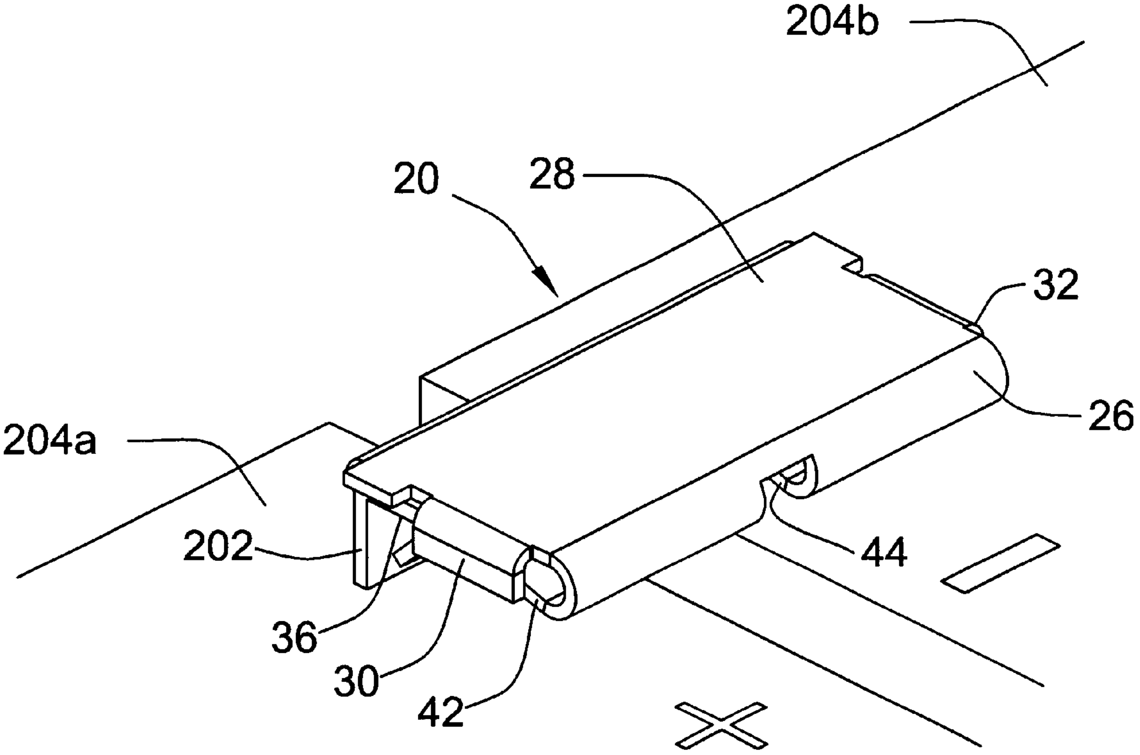
FIG. 3 is an expanded sectional view of a portion of the battery stack of FIG. 1 illustrating certain aspects of the battery terminal jumper clip of the invention in greater detail.

FIG. 3 illustrates an expanded perspective view of the battery terminal jumper clip 20, as installed to provide a series coupling between two adjacent batteries 204*a*, 204*b*, as taken along section 24 of FIG. 1. As may be seen from this sectional illustration, the front edge surface 26 of the battery terminal jumper clip 20 provides a relatively smooth rounded surface on which assembly personnel may press to install the clip 20 on the adjacent batteries to complete the series coupling therebetween. Since this clip 20 is a unitary, single piece construction, the rigidity of the top bus surface 28 allows both connections to the tab type terminals of the adjacent batteries in a single operation. This greatly reduces the assembly time, labor costs, and discomfort as compared to the prior methods of making this series coupling.

Also as may be seen from this expanded view, the clip 20 includes axial retention surfaces 30, 32 that prevent the clip 20 from working off of one of the tab type connectors in a lateral manner. That is, any lateral motion of the batteries that would tend to cause the clip 20 to creep in one lateral direction or the other will only be able to cause movement of the clip 20 to the point where the axial retention surface 30 or 32 contacts the edge of one of the tab connectors or the other. In addition to providing the retention function as just discussed, it should be noted that some relative movement is allowed between the two adjacent batteries without resulting in fatiguing of the tab terminal connectors due to the placement of the axial retention surfaces 30, 32.

Specifically, these surfaces 30, 32 are positioned in such a manner and with such a dimension so that preferably neither surface 30, 32 is in contact with the edge of either of the tab type terminal connectors when the batteries 204*a*, 204*b* are properly placed and the clip 20 is centered about the adjacent edges of the battery. In this way, either battery may move in a lateral side-to-side fashion toward or away from the other without fatiguing the tab connectors. This is accomplished by allowing the tab terminal connectors to freely move in a lateral side-to-side direction without encountering a constraining vertical surface until the outer axial retention surface 30, 32 is contacted. Even at this point, however, damage causing fatigue will still not occur on the tab terminal connector as the entire clip 20 will then slide laterally until the tab terminal connector on the other battery contacts the other axial retention surface 32. However, while slight vibration and some small lateral misalignments are common in UPS assembly operation, such larger scale movement is typically not encountered.

In addition to allowing relatively substantial lateral movement between adjacent batteries 204*a* and 204*b*, the battery terminal jumper clip 20 also allows relative vertical movement between the two batteries without unduly stressing the tab type terminal connectors 200, 202 and without breaking electrical or mechanical contact therewith. Specifically, the surface 26 is bent under the bus surface 28 forming two tab retention clips 42, 44. These two retention clips independently clamp onto its associated tab terminal connector 202, 204 respectively. As one battery moves in a vertical direction relative to the placement of the other battery, the tab retention clips 42, 44 will individually flex to accommodate the relative vertical movement.

Depending on the severity of the vertical relative movement, the bus surface 28 may be angled between the two tab terminal connectors. However, each of the two tab retention clips 42, 44 will flex to maintain a relatively uniform mechanical contact with the undersurface 36 of its respective tab terminal connector. This relatively uniform mechanical connection provides both mechanical stability as well as electrical continuity to maintain the series connection between the batteries under such conditions.

Figure 4:
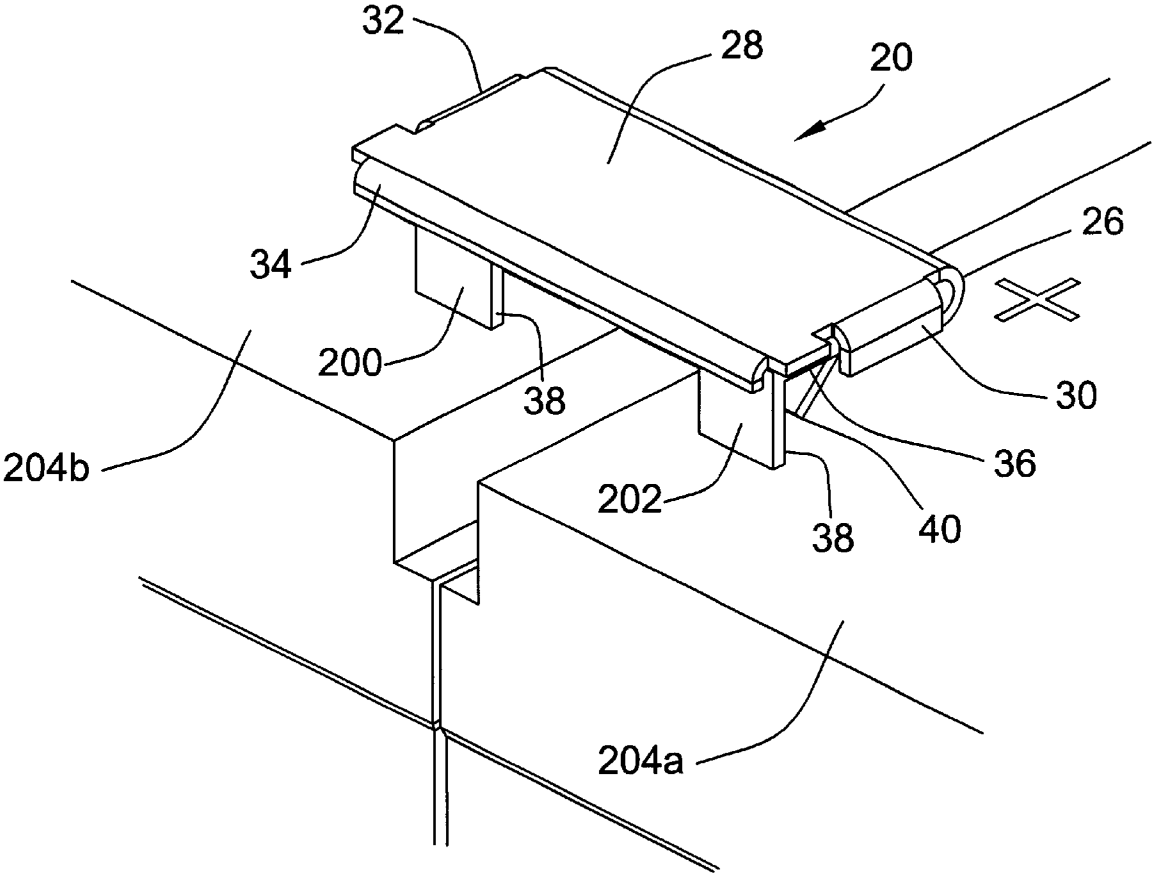
FIG. 4 is an expanded sectional view of a portion of the battery stack of FIG. 2 illustrating additional features of the battery terminal jumper clip of the invention in greater detail.

As may be seen from the rear view of the battery terminal jumper clip 20 as illustrated in FIG. 4, lateral movement of the clip 20 in a direction along the junction between the two batteries 204*a*, 204*b* is inhibited by the snap-on locking mechanism or surface 34 formed on the rear edge of the bus surface 28. As may be seen from this FIG. 4, this snap-on retention surface 34 drops down over the rear of the horizontal surface 36 of the tab type terminal connector 200, 202 thereby inhibiting the clip's inadvertent removal. As will be recognized by one skilled in the art, movement in the opposite lateral direction is inhibited by the front surface 26. Alternatively, this movement will be inhibited by the contacting of the vertical surface 38 of the tab type terminal connectors 200, 202 by the guided insertion surface 40 of the clip 20 (as will be described in greater detail below). The particular mechanism which will prevent movement in this direction is dependent somewhat on the length of the horizontal surface 36 of the tab type terminal connector in relation to a similar dimension of the bus surface 28.

Figure 5:
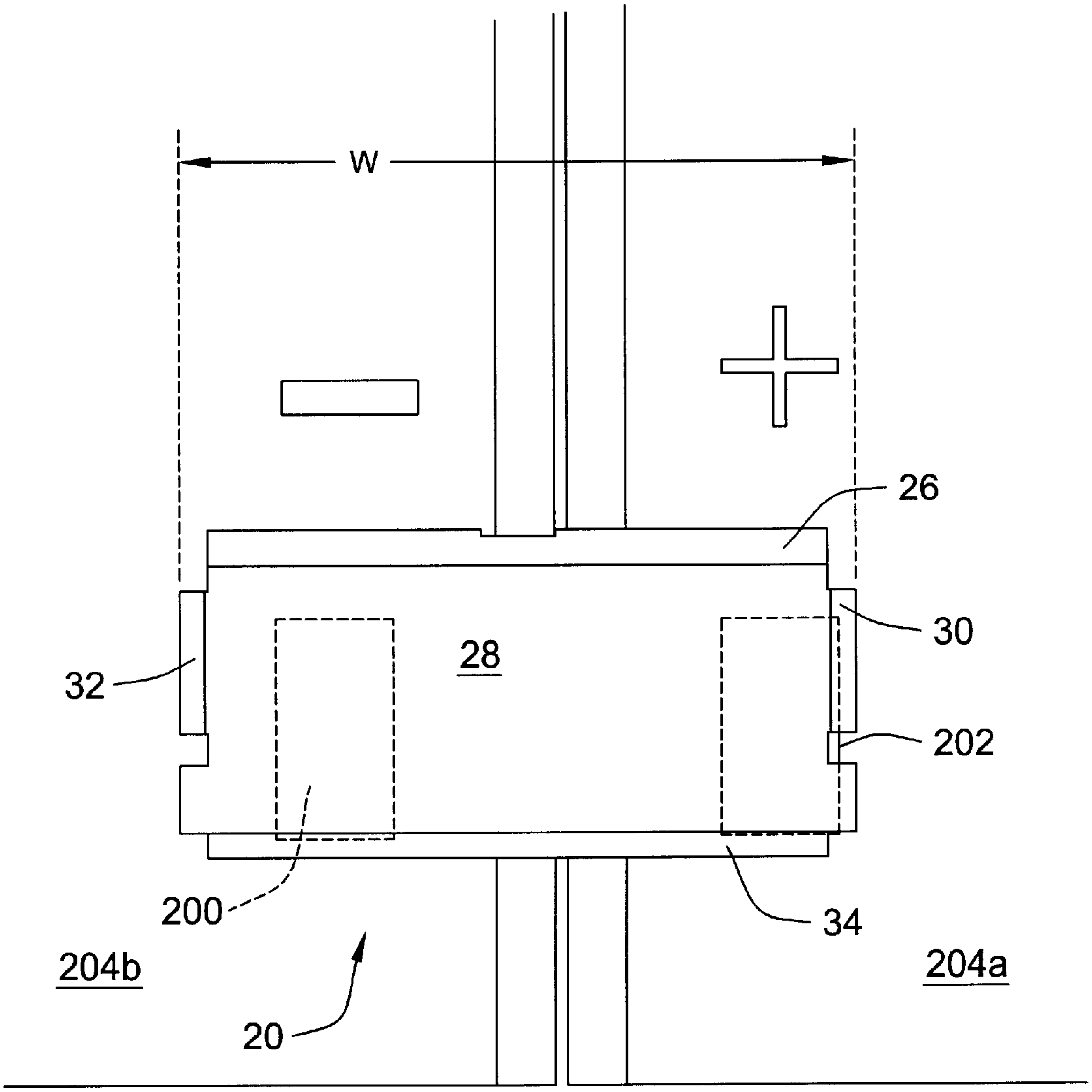
FIG. 5 is a top view of the battery terminal jumper clip of the invention installed on adjacent batteries in a battery stack forming a portion of an uninterruptible power supply.

FIG. 5 illustrates a top view of the installed battery terminal jumper clip 20 on batteries 204*a* and 204*b*. As this top view illustration of FIG. 5 demonstrates, the clip 20 may be positioned off center without stressing the tab type connectors. This is evident from the position of the tab connector 202 in proximity to the axial retention surface 30, but without the tab connector 200 being visible in a similar position with respect to surface 32. As such, battery 204*a* could move away from battery 204*b* quite a distance before both tab terminals 200, 202 would begin to contact surfaces 30 and 32.

Figure 6:
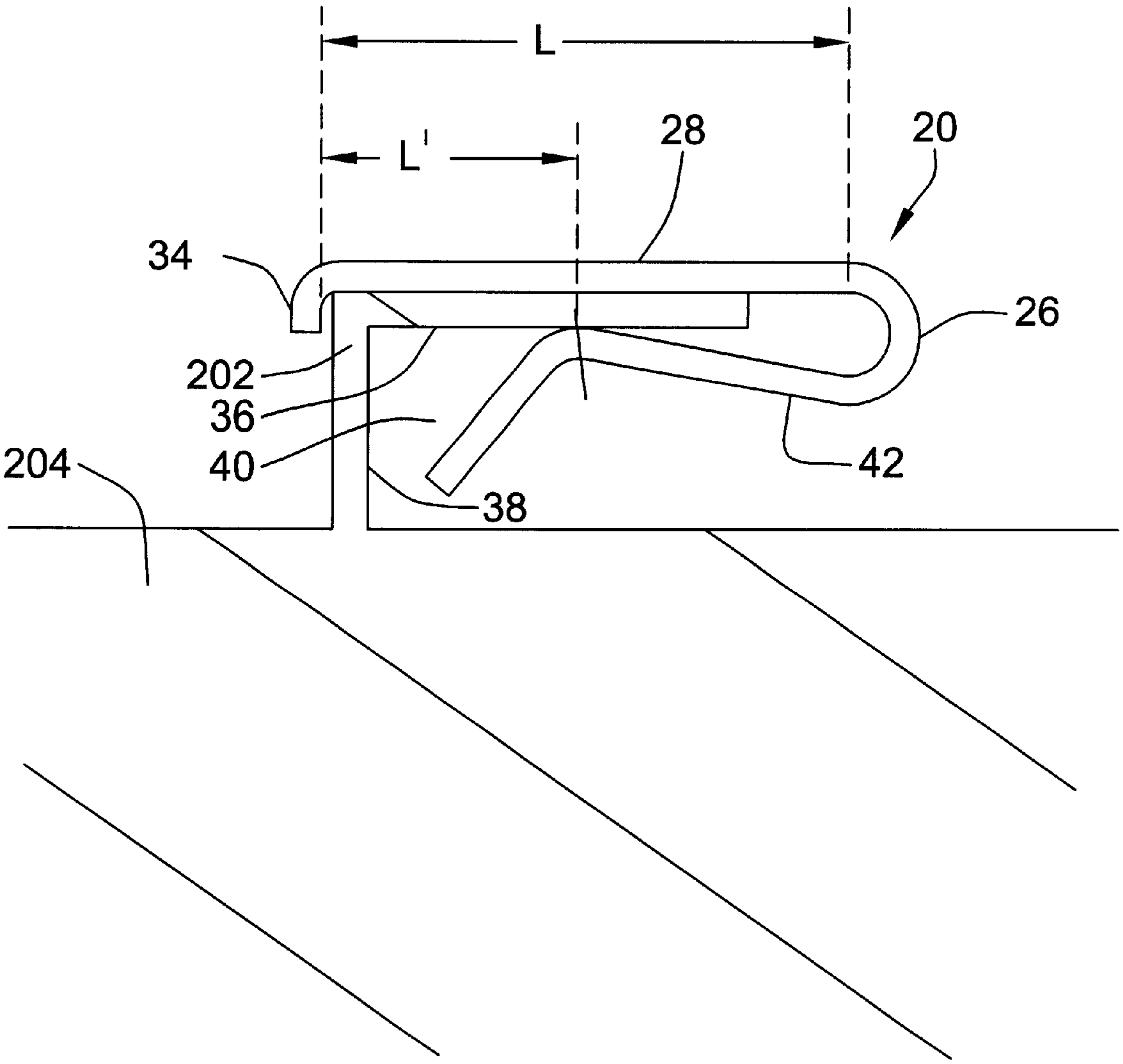
FIG. 6 is a side sectional view of the battery terminal jumper clip of the invention mounted on a battery tab terminal.

A cross-sectional view of the battery terminal jumper clip 20 is illustrated in FIG. 6 to which specific reference is made. This cross-sectional view clearly illustrates the interaction between the clip 20 and the battery's tab type terminal connector 202. Specifically, it may be seen that the snap-on locking mechanism or surface 34 extends beyond and over the ninety-degree bend of the tab terminal connector 202. This, in conjunction with the force applied by the tab retention clip 42 inhibits the clip 20 from being inadvertently removed from its installed position. It may also be seen from this cross-sectional illustration that the bus surface 28 provides approximately uniform electrical contact across the surface of the horizontal surface 36 of the tab terminal connector 202. As discussed above, this electrical connection is facilitated by the mechanical force applied by the tab retention clip 42. This retention clip 42 also provides an electrical contact point on the lower surface of the horizontal tab terminal connector surface 36. Both of these electrical connections may be facilitated in a preferred embodiment by applying a tin surface coating to the clip 20. This reduces the dissimilar metal contact problem that often results for batteries which utilize tin-plated tab terminal connectors.

While most batteries manufactured for inclusion in battery banks for uninterruptible power supplies utilize similar external physical construction, batteries from different manufacturers are not held to an industry standard for the physical placement and size of the tab terminal connectors included thereon. As such, the sizing and dimensioning of the battery terminal jumper clip 20 preferably allows for such physical deviation between manufacturers so that its applicability to battery banks constructed from batteries supplied from different manufacturers may be preserved. As illustrated in FIG. 6, this universal applicability may be accomplished by controlling the distance from the snap-on locking surface 34 to the mechanical contact point of the tab retention clip 42. This distance is illustrated in FIG. 6 as L'. By controlling this length to be less than the shortest length of the horizontal surface 36 of any tab terminal connector utilized in the industry, solid electrical and mechanical contact with the smallest connectors 202 may be ensured.

To accommodate larger tab terminal connectors, the distance L from the snap-on locking surface 34 to the surface 26 is controlled to be at least as long as the largest tab type terminal connector utilized in the industry in such applications. In this way the snap-on locking retention surface 34 will always be able to be properly seated to inhibit the inadvertent removal of clip 20. Also, the possible different placement of the tab type terminal connectors on the top surface of the batteries is accommodated by the distance W between the axial retention surfaces 30, 32 as illustrated in the above-described FIG. 5. Once again, if it is desired to construct a single clip 20 which will accommodate any battery manufactured for such an application, this distance W is controlled to be, preferably, slightly longer than the distance between the outer relative edges of the two tab terminal connectors required to make the series electrical connection.

Figure 7:
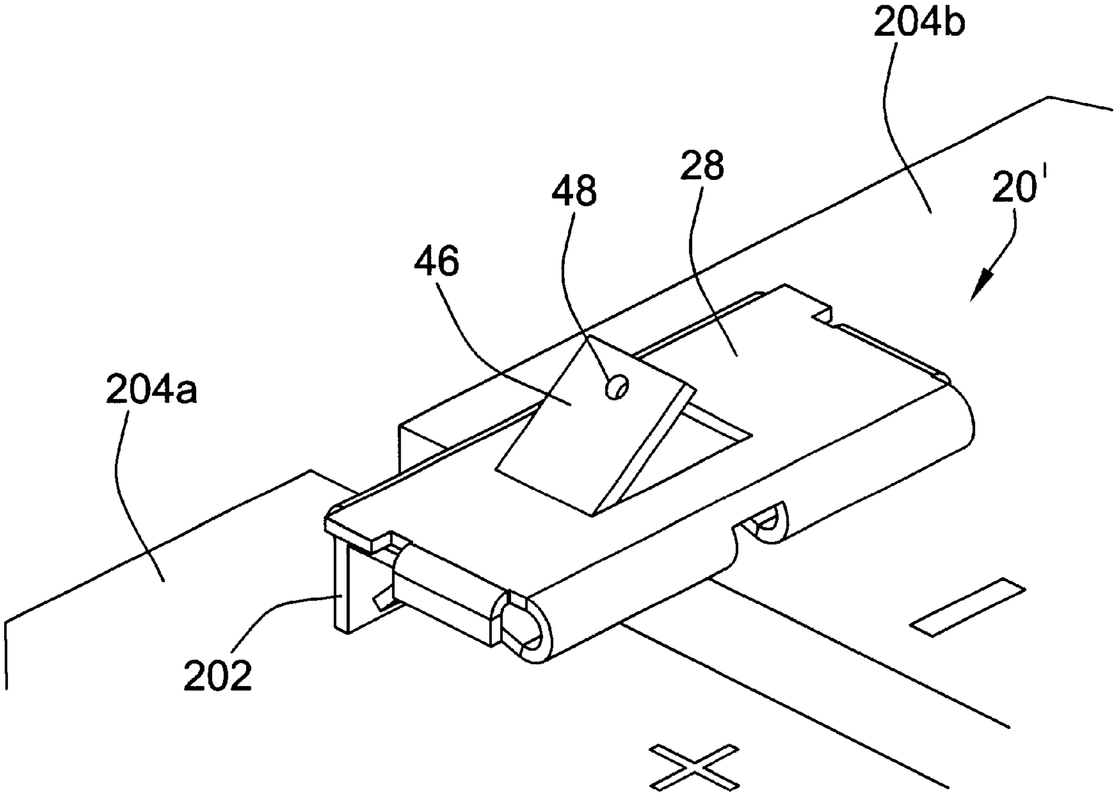
FIG. 7 is an expanded front perspective view of an alternate embodiment of the battery terminal jumper clip of the invention having a auxiliary connection terminal integrally formed therewith.
Figure 8:
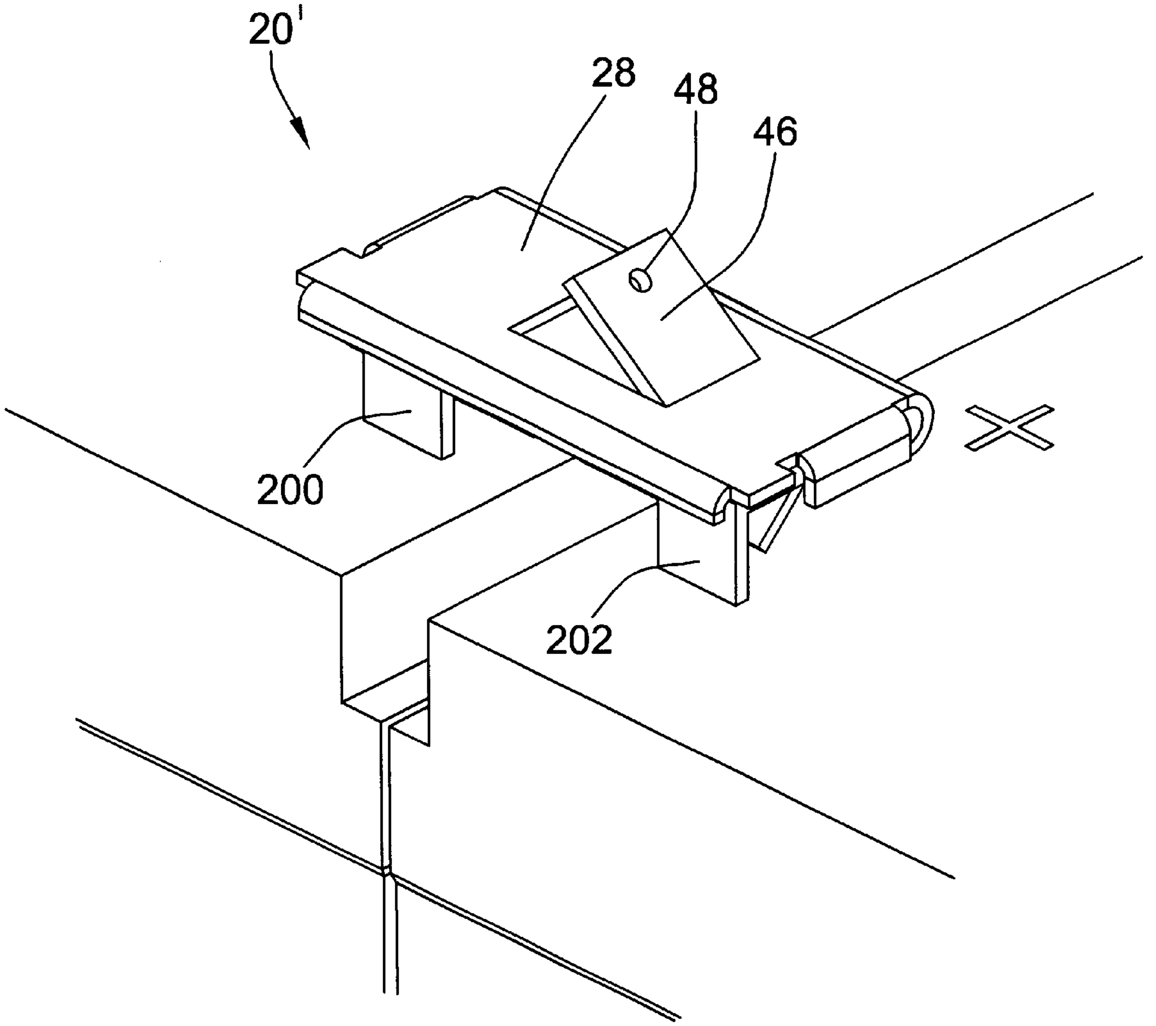
FIG. 8 is a rear perspective view of the embodiment of the battery terminal jumper clip of the invention illustrated in FIG. 7.

In an alternate embodiment of the battery terminal jumper clip 20' illustrated in FIG. 7, a auxiliary connection terminal 46 is formed in the horizontal bus surface 28. This auxiliary connection terminal 46 may also preferably include an aperture 48. The size of the auxiliary connection terminal 46 may be as desired, and is preferably sized to accommodate tab type terminal connections for conventional battery monitoring and utilization equipment. A rear view of this alternate embodiment 20' is illustrated in FIG. 8.

Figure 9:
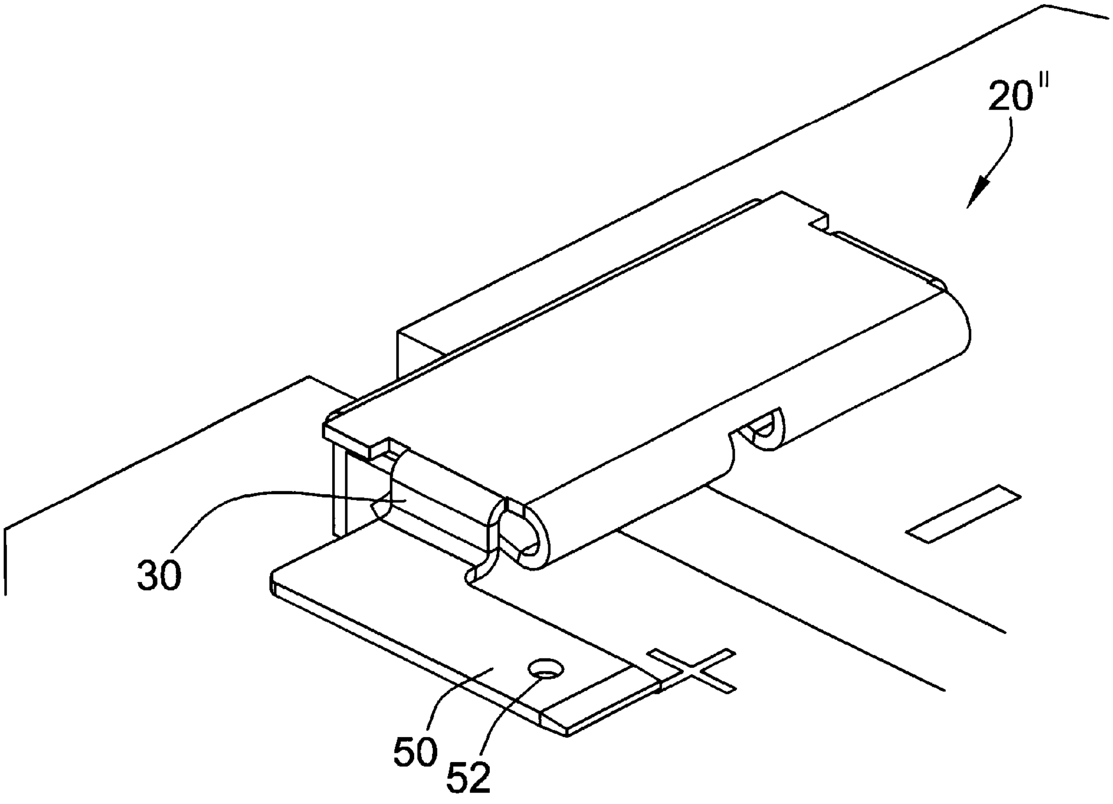
FIG. 9 is a front perspective illustration of an additional alternate embodiment of the battery terminal jumper clip including an integrally formed side voltage monitor terminal.

A further embodiment of the battery terminal jumper clip 20" having a battery auxiliary connection terminal 50 included therewith is illustrated in FIG. 9. As may be seen from this illustration, the auxiliary connection terminal 50 is formed as part of one of the axial retention surfaces 30. In this alternate configuration, the axial retention surface 30 includes an additional bend to the horizontal and a ninety-degree turn to allow the auxiliary connection terminal 50 to extend in a forward direction. This forward facing auxiliary connection terminal 50 is preferable to allow the most unobstructed access thereto. While the invention contemplates a battery auxiliary connection terminal which extends to the side, such configuration may not be desired in applications where the individual batteries and the battery stack are relatively thin and their tab terminal connectors 200, 202 are in close proximity to one another. With the configuration illustrated in FIG. 9, even in such situations the monitoring may be accomplished via tab 50 without interference between or the chance of a short across the tab terminal connectors 200, 202 of the same battery.

Figure 10:
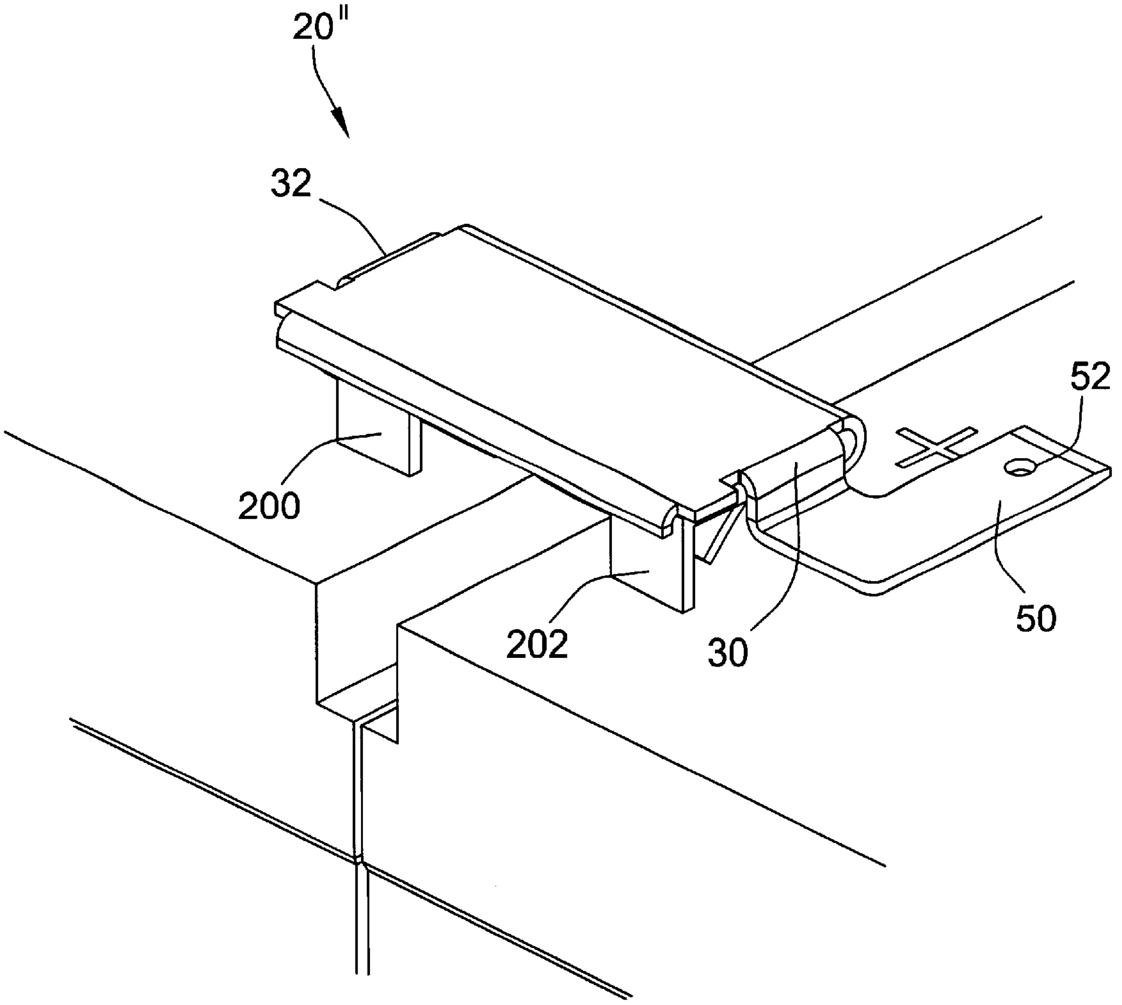
FIG. 10 is a rear perspective illustration of the battery terminal jumper clip illustrated in FIG. 10.

FIG. 10 illustrates a rear view of the battery terminal jumper clip 20" of FIG. 9. As may be more clearly visualized from this FIG. 10, the battery auxiliary connection terminal 50 is maintained at a sufficient vertical distance above the top of the battery to allow monitoring equipment to properly attached thereto.

Figure 11:
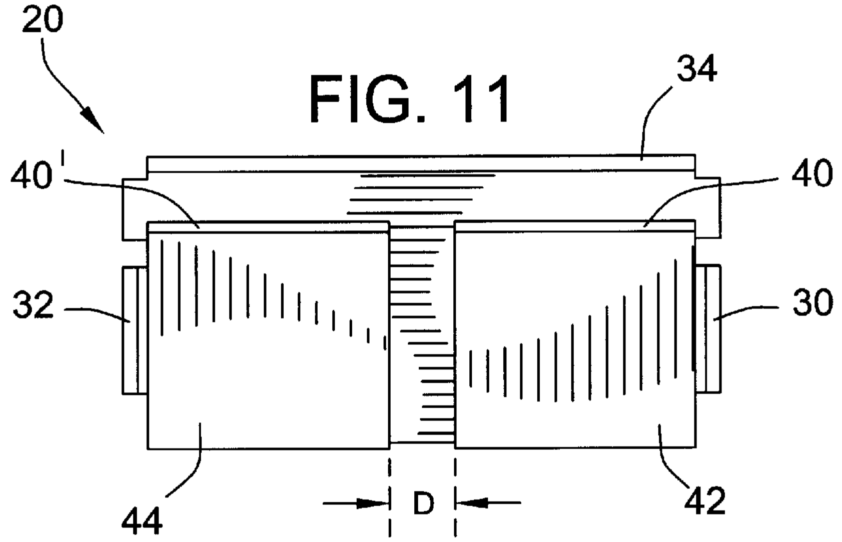
FIG. 11 is a bottom view of an embodiment of the battery terminal jumper clip of the invention having a separate tab retention clip for each battery terminal.

Turning now to the bottom view illustration of the battery terminal retention clip 20 of the invention, the tab retention clips 42, 44 may be examined in closer detail. In a preferred embodiment as illustrated in FIG. 11, the battery terminal retention clip 20 includes two tab retention clips 42, 44 configured to individually contact one of the two tab terminal connectors 200, 202 required to make the series connection between adjacent batteries. The distance D between these two retention clips 42, 44 is sized to preferably preclude the contact of one retention clip 42, 44 with both tab terminal connectors 200, 202 at the same time. This distance D takes into account the condition where the clip 20 has slid its maximum distance to one side so that one of the tab terminal connectors is contacting one of the axial retention surfaces 30 or 32.

By providing two independently flexible retention clips 42, 44, any relative vertical movement between adjacent batteries may be fully accommodated by the individual flexure of the retention clips 42, 44 with the vertical position of its associated tab type terminal connector. As may be seen in this FIG. 11, each of the tab retention clips 42, 44 terminates in a guided insertion surface 40 that significantly aids in the installation of the clip 20.

Figure 12:
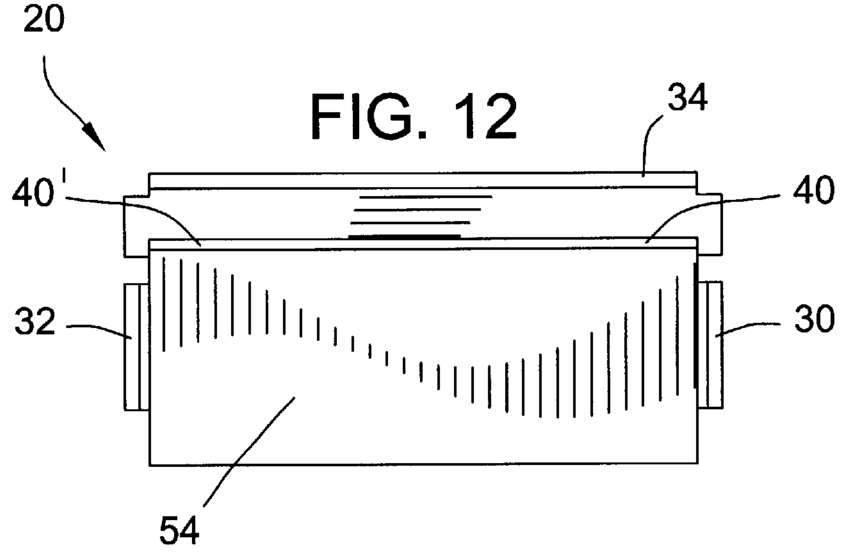
FIG. 12 is a bottom view of an alternate embodiment of the battery terminal jumper clip having a single tab retention clip spanning both batteries' tab terminals.

An alternate embodiment of the battery terminal jumper clip 20 is illustrated in FIG. 12. As may be seen from this alternate embodiment, a single tab retention clip 54 is formed. This single retention clip 54 contacts both tab type terminal connectors. While relative vertical motion between adjacent batteries is not individually accommodated as in the case of the embodiment in FIG. 11, adequate electrical and mechanical contact is still maintained to each of the tab type terminal connectors by the clip 20 to maintain a reliable series coupling therebetween.

Figure 13:
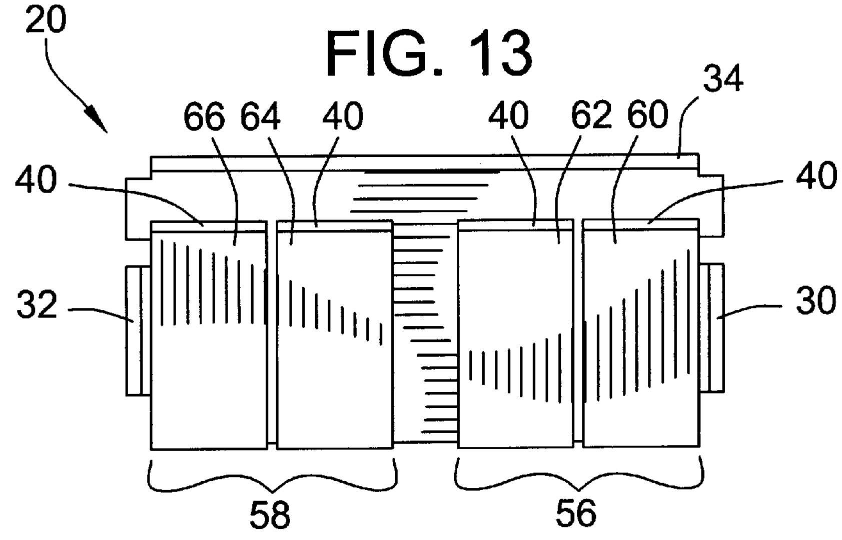
FIG. 13 is a bottom view of a further alternate embodiment of the battery terminal jumper clip of the invention illustrating separate bifurcated tab retention clips.

Yet a further embodiment of the battery terminal retention clip 20 is illustrated in FIG. 13. As may be seen from this bottom view illustration, two bifurcated tab retention clips 56, 58 are provided. Each of these two bifurcated retention clips 56, 58 provide two independently flexible clips 60, 62 and 64, 66. In such a configuration, the battery terminal jumper clip 20 may accommodate even greater relative vertical movement between the adjacent batteries without stressing the tab type terminal connectors. Additionally, by maintaining multiple points of electrical contact during such relative vertical motion between adjacent batteries, this embodiment also provides improved electrical connection to the bottom surface of each of the tab terminal connectors. Of course from an electrical standpoint, while two individual retention clips 60, 62 are illustrated to make up the retention clip 56, the number of individual sections may be increased significantly. However, from a mechanical stability and manufacturability standpoint, a limit on the number of individual constituent retention clip segments to make up the overall retention clip 56, 58 will reach a practical limit. While more than two may be applicable and are clearly within the scope of the invention, physical practicalities and system requirements and constraints may well limit the number of these constituent clip segments.

Figure 14:
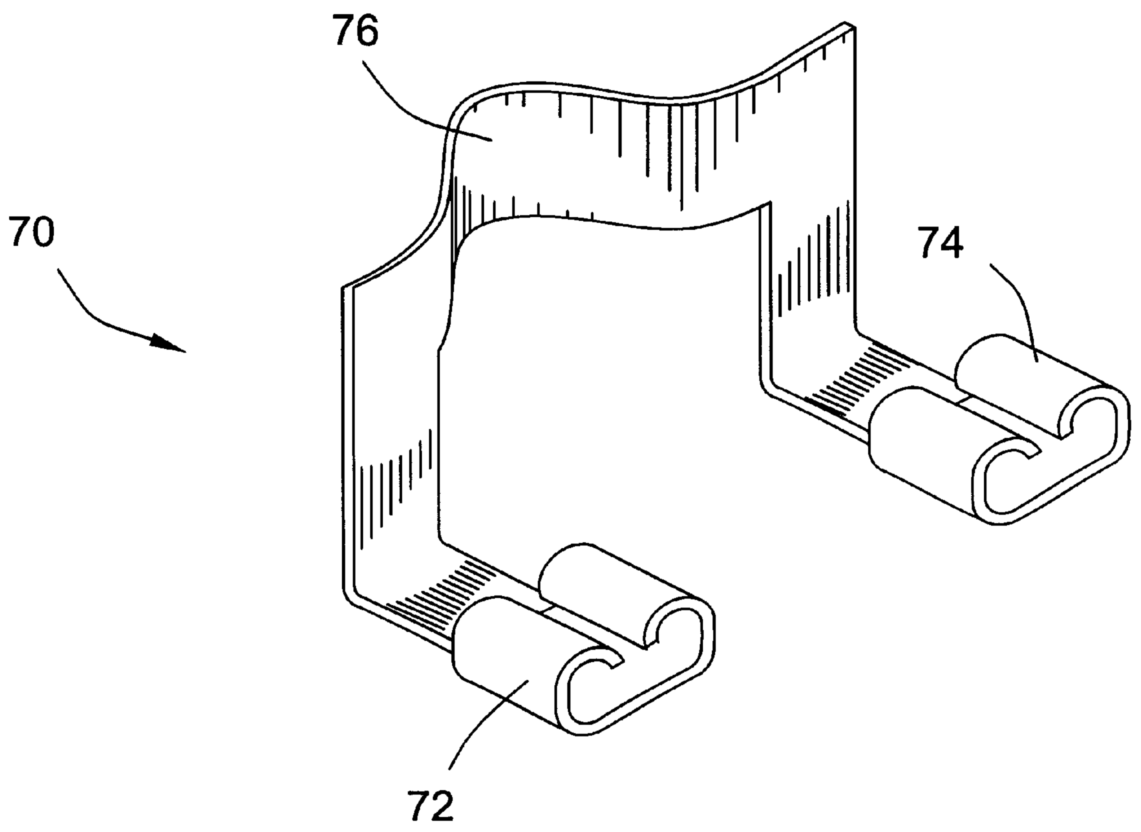
FIG. 14 is a perspective view illustration of an alternate embodiment of the battery clip of the invention.
Figure 15:
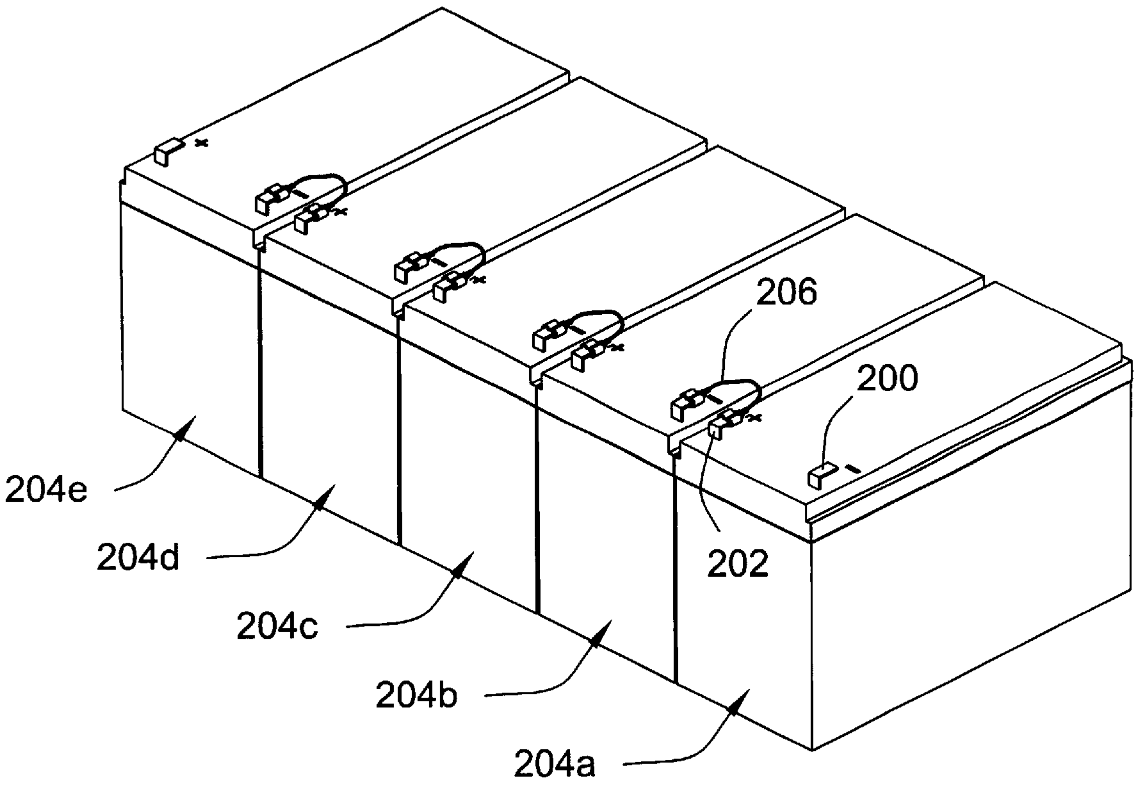
FIG. 15 PRIOR ART
FIG. 15 is a perspective illustration of a portion of a battery bank of an uninterruptible power supply utilizing a prior jumper connection to provide series coupling between adjacent batteries.
Figure 16:
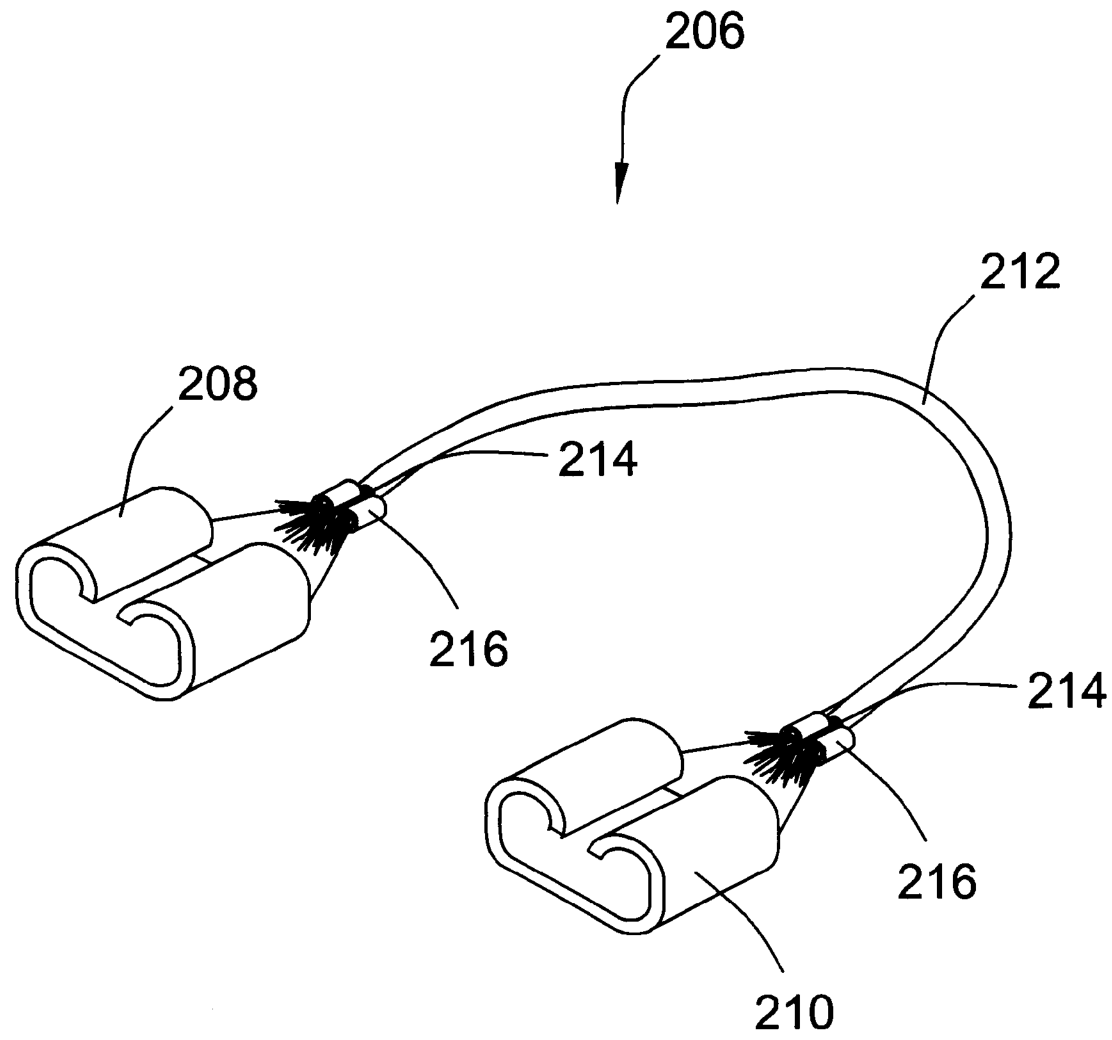
FIG. 16 PRIOR ART
FIG. 16 is a perspective illustration of the prior jumper apparatus illustrated in FIG. 15.

An alternate embodiment of a battery terminal clip 70 constructed in accordance with the teachings of the invention is illustrated in FIG. 14. In this embodiment, the clip 70 includes two battery terminal retention clips 72, 74 coupled one to another by a flexible bus 76. The flexibility of the bus 76 allows for relative movement between the batteries without unduly stressing the tab type terminal connectors thereon. Unlike the prior coupling apparatus illustrated in FIG. 16, the clip 70 of FIG. 14 is a unitary component. This greatly simplifies the manufacture of this clip 70, while increasing the reliability and reducing the cost thereof.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A battery terminal jumper clip for providing electrical coupling between two adjacent batteries, the batteries having tab type terminal connectors to allow connection thereto, comprising:

a unitary, conductive structure defining a bus surface and at least one tab retention clip positioned in relation to said bus surface to provide an interference fit with a tab terminal connector of a battery inserted therebetween; and wherein said unitary conductive structure further forms two axial retention surfaces at opposite ends of said bus surface and in perpendicular relationship thereto, said axial retention surfaces being spaced one from another to accommodate tab terminal connectors from two batteries therebetween; and wherein said unitary conductive structure further forms a snap-on retention surface along a forward edge of said bus surface in perpendicular relationship thereto.

2. The battery terminal jumper clip of claim 1, wherein said tab retention clip forms a guided insertion surface in relation to said snap-on retention surface.

3. The battery terminal jumper clip of claim 2, wherein an axial distance L' from an inner surface of said snap-on retention surface to a forward-most point of contact of said tab retention clip that forms said interference fit with the tab terminal connector is less than a length of the tab terminal connector.

4. The battery terminal jumper clip of claim 3, wherein an axial distance L from an inner surface of said snap-on retention surface to a surface formed between said bus surface and said tab retention clip is greater than a length of any tab terminal connector, thereby allowing the battery terminal jumper clip to accommodate batteries that utilize tab terminal connectors.

5. The battery terminal jumper clip of claim 2, wherein an axial distance L' from an inner surface of said snap-on retention surface to a surface formed between said bus surface and said tab retention clip is greater than a length of the tab terminal connector.

6. The battery terminal jumper clip of claim 1, wherein the tab terminal connector is coated with a metal, and wherein at least a portion of said unitary, conductive structure that is adapted to contact the tab terminal connector is coated with a like metal with which the tab terminal connector is coated.

7. The battery terminal jumper clip of claim 6, wherein said like metal is tin.

8. The battery terminal jumper clip of claim 1, wherein a distance W between said axial retention surfaces is adapted to accommodate lateral movement of the tab terminal connectors of the batteries when installed thereon.

9. The battery terminal jumper clip of claim 1, wherein a distance W between said axial retention surfaces is greater than a distance between the two tab terminal connectors of two batteries to be coupled thereby, thereby allowing the battery terminal jumper clip to accommodate batteries that utilize tab terminal connectors.

10. The battery terminal jumper clip of claim 1, wherein a surface formed between said bus surface and said tab retention clip is rounded.

11. The battery terminal jumper clip of claim 1, wherein said unitary, conductive structure forms at least two tab retention clips positioned to individually contact one of a battery's tab terminal connectors when installed thereon.

12. The battery terminal jumper clip of claim 1, wherein said unitary, conductive structure forms at least two groups of tab retention clips, each group comprising a plurality of individual tab retention clips sized to contact only a portion of a battery's tab terminal connector.

13. The battery terminal jumper clip of claim 1, wherein said unitary, conductive structure forms an auxiliary connection terminal.

14. The battery terminal jumper clip of claim 13, wherein said auxiliary connection terminal is formed integrally with said bus structure.

15. The battery terminal jumper clip of claim 13, wherein said auxiliary connection terminal is formed integrally with one of said axial retention surfaces.

16. The battery terminal jumper clip of claim 13, wherein said auxiliary connection terminal includes an aperture formed therein.

17. A battery terminal jumper clip, comprising:

a solid conductive bus structure;

at least one tab retention clip integrally formed with said bus structure, said tab retention clip operative in relation to said bus structure to establish mechanical and electrical contact with a battery tab type terminal connector when positioned thereon; and a forward surface integrally formed with said bus structure and positioned in perpendicular relation thereto, said forward surface extending toward said tab retention clip.

18. The battery terminal jumper clip of claim 17, further comprising axial retention surfaces integrally formed with said conductive bus structure and positioned in perpendicular relation thereto, said axial retention surfaces extending toward said tab retention clip to inhibit removal of said battery terminal jumper clip once installed on a battery tab type terminal connector.

19. The battery terminal jumper clip of claim 18, wherein said bus structure has a width W defined between said axial retention surfaces sufficient to allow axial movement of the battery tab type terminal connectors of two adjacent batteries when said battery terminal jumper clip is installed thereon.

20. The battery terminal jumper clip of claim 17, wherein said bus structure has a length L defined between said forward surface and a reward surface formed between said bus structure and said tab retention clip sufficient to accommodate battery tab type terminal connectors of different lengths.

21. The battery terminal jumper clip of claim 17, wherein a length L' defined between an inner surface of said forward surface and a forward contact point of said tab retention clip is sufficient to accommodate battery tab type terminal connectors of different lengths.

22. The battery terminal jumper clip of claim 17, wherein a surface between said bus structure and said tab retention clip is coated with a similar metal to the battery tab type terminal connectors.

23. The battery terminal jumper clip of claim 17, wherein said tab retention clip forms a guided insertion surface at a forward end thereof.

24. The battery terminal jumper clip of claim 17, wherein said tab retention clip is bifurcated to accommodate vertical movement of adjacent batteries when installed thereon.

25. The battery terminal jumper clip of claim 17, further comprising an integrally formed auxiliary connection terminal.

26. The battery terminal jumper clip of claim 25, wherein said auxiliary connection terminal is integrally formed within said bus structure.

27. The battery terminal jumper clip of claim 25, wherein said auxiliary connection terminal is integrally formed with one of said axial retention surfaces.

28. A battery pack, comprising at least two batteries positioned adjacent one another, each of said batteries having at least one tab type terminal connector for providing electrical connection thereto; and a battery terminal jumper clip coupled to said tab type terminal connector of each battery to provide electrical connection therebetween, said battery terminal jumper clip comprising a solid conductive bus structure, at least one tab retention clip integrally formed with said bus structure, said tab retention clip operative in relation to said bus structure to establish mechanical and electrical contact with said batteries' tab type terminal connectors positioned therebetween, and a forward surface integrally formed with said bus structure, said forward surface extending over said tab type terminal connector to inhibit removal of said battery terminal jumper clip from said tab type terminal connectors.

29. The battery pack of claim 28, wherein said tab type connectors and said battery terminal jumper clip are coated with like metals.

30. The battery pack of claim 28, wherein said battery terminal jumper clip further comprises axial retention surfaces integrally formed with said conductive bus structure and positioned to inhibit axial removal of said battery terminal jumper clip from said tab type terminal connectors.

31. The battery pack of claim 30, wherein said axial retention surfaces are positioned so as to allow axial movement of said batteries inhibiting movement of said tab type terminal connectors.

* * * * *